United States Patent Office.

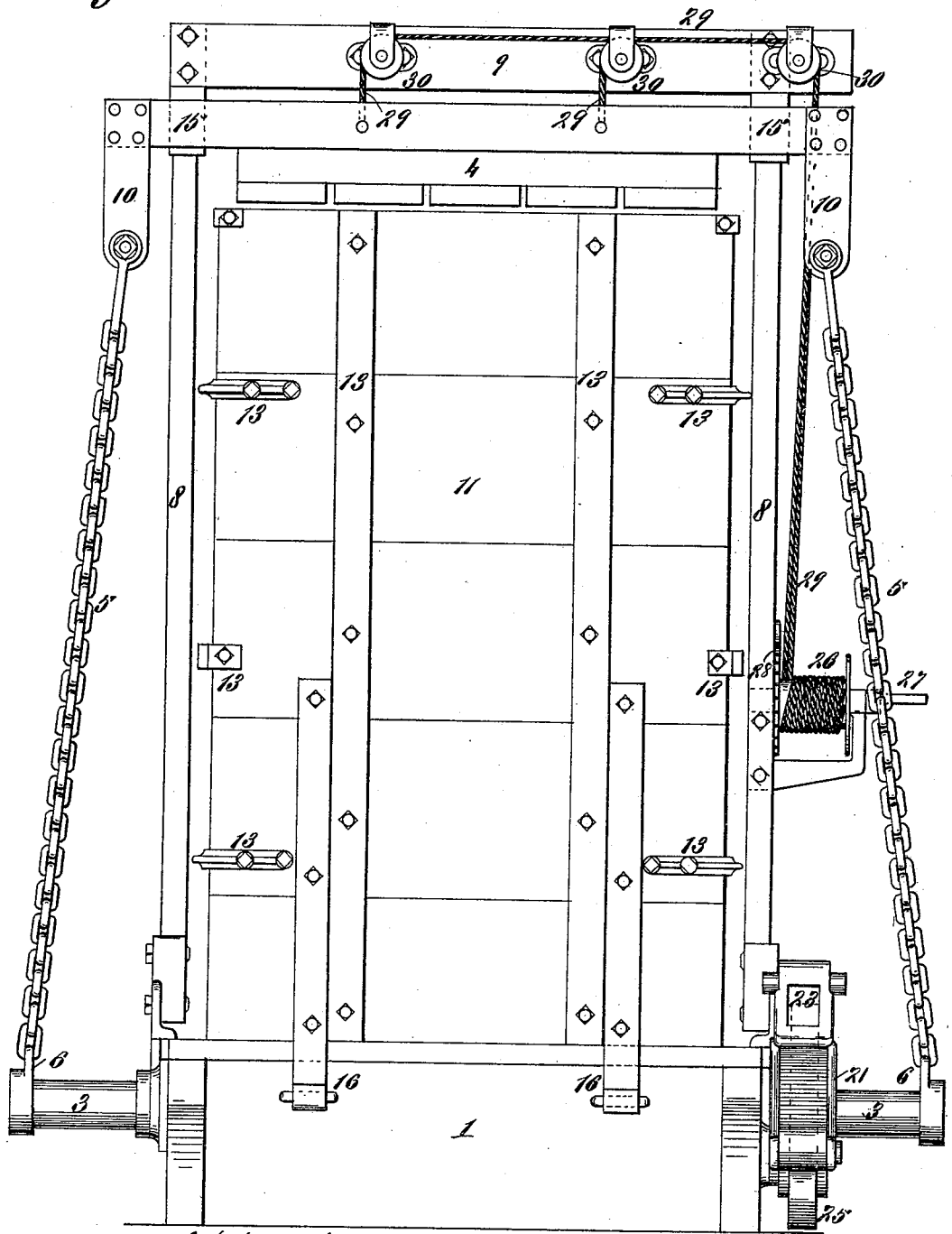

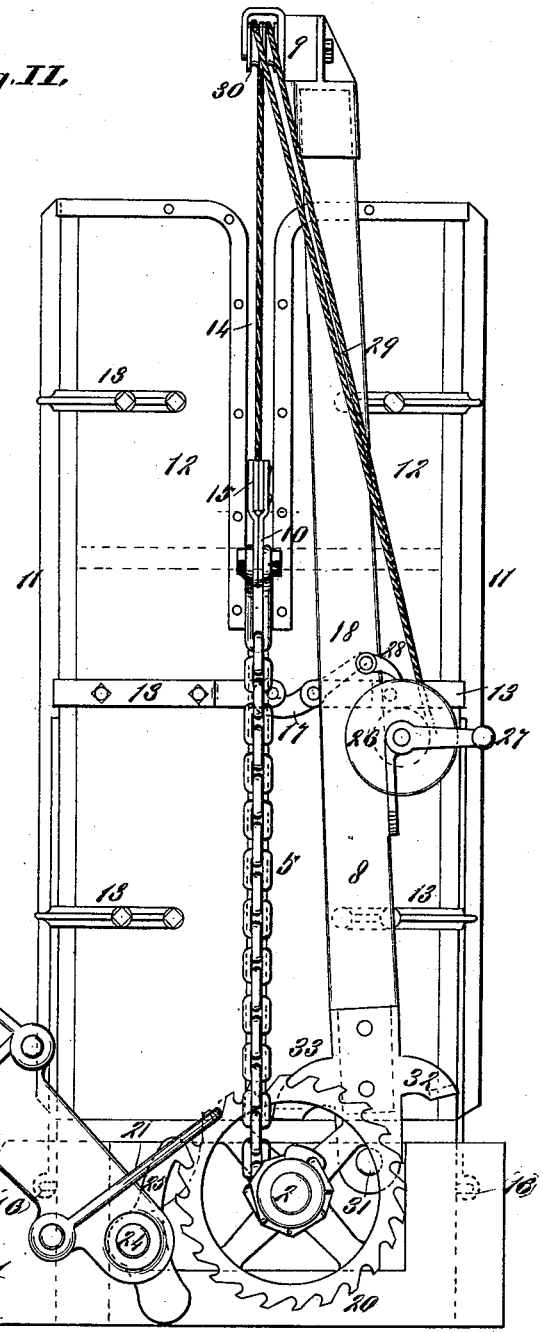

CHARLES E. WHITMAN, OF ST. LOUIS, MISSOURI.

BALING-PRESS.

SPECIFICATION forming part of Letters Patent No. 463,929, dated November 24, 1891.

Application filed June 20, 1891. Serial No. 396,934. (No model.)

*To all whom it may concern:*

Be it known that I, CHARLES E. WHITMAN, of the city of St. Louis, in the State of Missouri, have invented a certain new and useful Improvement in Baling-Presses, of which the following is a full, clear, and exact description, reference being had to the accompanying drawings, forming part of this specification.

My invention relates to certain improvements in hand-baling presses; and it consists in features of novelty hereinafter fully described, and pointed out in the claims.

Figure I is a side elevation of my improved press. Fig. II is an end view, and Fig. III is a detail view, showing one of the catches or hooks for holding the two sections of the press together during the baling operation.

Referring to the drawings, 1 represents a base, through which passes and in which is journaled a shaft 2, having extended ends 3, to which the traverser 4 is connected by chains 5 or their equivalent, such as a cable or rope. The lower ends of the chains are secured to the ends 3 of the shaft by means of short cranks 6. As the shaft is turned the chains 5 are wound upon the ends 3 of the shaft, and the traverser is thus pulled down upon the material to press it.

8 8 are guide-rods connected to the base 1 at their lower ends, and having their upper ends connected together by means of a cross-head 9.

I have shown the upper ends of the chains 5 secured to the traverser by means of downwardly-extending projections 10 on the latter.

The baling-chamber of the press is composed of sides 11 and ends 12, suitably braced and strengthened by straps 13 of iron or other suitable material. The ends are divided from top to bottom by means of a slot or joint 14, which is wide enough at its upper portion to permit the passage of the extended ends 15 of the traverser. The baling-chamber is thus composed of two sections or members each section or member consisting of one side and the half of two ends, and each section is hinged to the base 1, as shown at 16, so that when a bale has been formed the members can be opened out to permit the removal of the bale. When in use the members are held together by suitable hooks or catches 17, (see Figs. II and III,) the hooks being pivoted at 18 to one of the straps 13 and adapted to engage a pin or projection 19 on the straps 13 of the other member of the baling-chamber. There will be a hook at each end of the press, so as to hold the members firmly together during the pressing of the bale.

The downward movement of the traverser is effected by a ratchet-wheel 20, mounted on the shaft 2 and engaged by pawls 21 and 22, pivoted to an operating-lever 23, which is itself pivoted at 24 to the base 1. During the first part of the movement of the traverser, when speed and not power is required or desirable, the pawl 22 is thrown into engagement with the ratchet-wheel 20, and when the final pressure is to be applied the pawl 21 is brought into use, as shown in Fig. II, which affords less speed, but greater power, as it is located nearer the pivot of the lever than the pawl 22 is. In this manner I am enabled to get a very rapid and also a very powerful action, as desired.

25 represents a dog pivoted to the base 1, preferably at 24, and which is adapted to engage the ratchet-wheel 20 to prevent the retrograde movement of the ratchet-wheel and the shaft 2 as the lever is being operated to press the material.

When the traverser is to be raised, it is done by means of a drum or windlass 26, provided with an operating-crank 27, and a pawl and ratchet 28 to prevent the retrograde movement. The windlass is connected by ropes or cables 29 to the traverser 4, these ropes or cables passing over pulleys 30, secured to the cross-head 9. The windlass is mounted on one of the rods or beams 8, as shown in Figs. I and II. As the traverser is being raised the pawls 21 and 22 and the dogs 25 are thrown out of engagement with the ratchet-wheel 20, so that the chains 5 can be unwound from the ends 3 of the shaft 2 by the backward rotation of the shaft.

To facilitate the feeding of the press, the rods or beams 8 are pivoted to the base 1 at 31, and are provided with stops 32 and 33, which come in contact with the base and limit, respectively, the forward and backward movement of the rods or beams, so that when the pressing is being done the stops 33 will rest against the base, as shown in Fig. II, and when the press is being fed the stops 32 will rest against the base, holding the rods or beams and the traverser in an inclined position, with the latter moved from over the baling-chamber.

A press thus made is strong and durable, is easy to operate, and is, as stated, capable of both a rapid and a powerful movement of the traverser at the proper times.

I claim as my invention—

1. In a baling-press, the combination of a baling-chamber, a traverser, a shaft, connection between the shaft and the traverser, a ratchet-wheel on the shaft, a pivoted lever and two pawls connected to the lever, one close to the pivot of said lever and the other at a greater distance from said pivot, either of said pawls being adapted to engage said ratchet during the movement of the outer end of the lever in one direction and to be disengaged therefrom during the movement of the outer end of said lever in the opposite direction, substantially as described.

2. In a baling-press, the combination of a baling-chamber mounted on a suitable base, a shaft journaled in the base and having extended ends, a traverser connected to the extended ends of the shaft by winding connections, a ratchet-wheel on the shaft, a lever pivoted at a distance from said shaft, and pawls connected to the lever, one close to the pivot of said lever and the other a distance from said pivot, either of said pawls being adapted to engage said ratchet during the descent of the outer end of the lever and to be disengaged therefrom during the ascent of the outer end of said lever, substantially as set forth.

3. In a baling-press, the combination of a chamber, a traverser, a mechanism for imparting movement to the traverser, pivoted beams or rods carrying the traverser, and stops 32 33 on the rods or beams, substantially as and for the purpose set forth.

4. In a baling-press, the combination of a chamber, a traverser, a mechanism for moving the traverser in a downward direction, a windlass and ropes for moving the traverser in an upward direction, and pivoted beams provided with stops, and which are adapted to carry the windlass, ropes, and traverser, substantially as and for the purpose set forth.

CHARLES E. WHITMAN.

In presence of—
E. S. KNIGHT,
A. M. EBERSOLE.